United States Patent [19]

Chaum

[11] Patent Number: 5,878,140

[45] Date of Patent: Mar. 2, 1999

[54] LIMITED-TRACEABILITY SYSTEMS

[75] Inventor: David Chaum, Sherman Oaks, Calif.

[73] Assignee: DigiCash Incorporated, New York, N.Y.

[21] Appl. No.: 944,637

[22] Filed: Oct. 6, 1997

Related U.S. Application Data

[62] Division of Ser. No. 193,500, Feb. 8, 1994, Pat. No. 5,712,913.

[51] Int. Cl.$^6$ ........................................................ H04L 9/30
[52] U.S. Cl. ................................................. 380/24; 380/30
[58] Field of Search .................................. 380/24, 25, 30

[56] References Cited

U.S. PATENT DOCUMENTS

| | | | |
|---|---|---|---|
| 4,438,824 | 3/1984 | Mueller-Schloer | 380/25 |
| 4,458,109 | 7/1984 | Mueller-Schloer | 380/25 |
| 4,759,063 | 7/1988 | Chaum | 380/30 |
| 4,759,064 | 7/1988 | Chaum | 380/30 |
| 4,868,877 | 9/1989 | Fischer | 380/30 |
| 4,879,747 | 11/1989 | Leighton et al. | 380/24 |
| 4,947,430 | 8/1990 | Chaum | 380/30 |
| 4,949,380 | 8/1990 | Chaum | 380/30 |
| 4,987,593 | 1/1991 | Chaum | 380/30 |
| 5,131,039 | 7/1992 | Chaum | 380/30 |
| 5,224,162 | 6/1993 | Okamoto et al. | 380/24 |
| 5,276,736 | 1/1994 | Chaum | 380/24 |
| 5,276,737 | 1/1994 | Micali | 380/30 |
| 5,315,658 | 5/1994 | Micali | 380/30 |
| 5,373,558 | 12/1994 | Chaum | 380/30 |
| 5,521,980 | 5/1996 | Brands | 380/30 |
| 5,553,145 | 9/1996 | Micali | 380/24 |
| 5,604,805 | 2/1997 | Brands | 380/30 |
| 5,712,913 | 1/1998 | Chaum | 380/30 |

OTHER PUBLICATIONS

Chaum et al., "Demonstrating Possession of a Discrete Logarithm Without Revealing It", Centre for Mathematics and Computer Science, Kruislaan 413, 1098 SJ Amsterdam, The Netherlands, CRYPTO '86, Springer–Verlag, 1987, pp. 200–212.

Primary Examiner—Salvatore Cangialosi
Attorney, Agent, or Firm—Nixon & Vanderhye P.C.

[57] ABSTRACT

Cryptographic methods and apparatus for payment and related transaction systems are disclosed that allow some kinds of tracing under some conditions and make substantially infeasible other kinds of tracing under other conditions. Examples include: allowing tracing if and only if agreed sets of trustees cooperate; tracing from a payment to the payer by cooperation of a set of trustees; tracing from a payment to the payer without revealing to trustees which payer is being traced or which payment; identifying all payments by a payer provided appropriate trustees cooperate; and identifying all payments by a payer under investigation without trustees learning which payer and/or which payments;

Other examples include: limiting resolution to groups of payers in tracing for statistical purposes; allowing limited different markings of payment instruments while preventing payers from learning which marking they receive; providing for recovery of lost money without compromise of unrelated transactions; allowing participants the ability to retain, not forward, and even destroy some tracing information without financial harm; providing the option of artificial increase in the computational cost of at least some tracing; and providing the option of blurry linking of payments to payers.

10 Claims, 6 Drawing Sheets

LIMITED-TRACEABILITY SYSTEMS

RELATED APPLICATIONS

This is a divisional of application Ser. No. 08/193,500 filed Feb. 8, 1994, now U.S. Pat. No. 5,712,913 issued Jan. 27, 1998. It is also related to application Ser. No. 08/910,123 filed Aug. 12, 1997, now U.S. Pat. No. 5,781,631 issued Jul. 14, 1998 as another division of 08/193,500.

BACKGROUND OF THE INVENTION

1. Field of the Invention

This invention relates to transaction systems, and more specifically to cryptographic protocols and other techniques for ensuring security and privacy.

2. Description of Prior Art

Reference is hereby made to the following U.S. patents by the present applicant that are included herein by reference: U.S. Pat. No. 4,759,063 "Blind signature systems"; U.S. Pat. No. 4,759,064 "Unanticipated blind signature systems"; U.S. Pat. No. 4,947,430 "Card computer moderated systems"; U.S. Pat. No. 4,949,380 "Returned-value blind signature systems"; U.S. Pat. No. 4,987,593 "One-show blind signature systems"; and U.S. Pat. No. 5,131,039 "Optionally moderated transaction systems."

Payment systems today structurally provide either substantially unlimited traceability of payments or substantial untraceability. Bank notes and checks are paper-based examples of each extreme. Most digital systems proposed to date are similarly polarized into substantially traceable and substantially untraceable.

A variety of perceived requirements are believed to suggest a need for systems that have some provisions for traceability. Examples include: blacklisting known abusers of a system; investigations related to violation of law; marking of bearer instruments given to suspected criminals; statistical analysis of aggregated consumer behavior; recovery of money in case of unanticipated loss of information; and maintenance and provision by participants in payments of comprehensive records.

On the other hand, a variety of perceived requirements are believed to suggest a need for some corresponding limitations on traceability. Examples include: preventing use of blacklisting mechanism for unauthorized blacklisting or tracing; controlling how many investigations are made and maintaining confidentiality of who is being investigated; preventing marking of money withdrawn from occurring more than to a limited extent; ensuring that statistical studies cannot determine individually identifiable data; preventing use of a recovery mechanism by parties other than the party whose data is being recovered; and allowing recipients and intermediaries in payments some control over clandestine or otherwise improper use of tracing information.

OBJECTS OF THE INVENTION

Accordingly, objects of the present invention include:

allowing tracing under one or more conditions and preventing it under other conditions;

allowing tracing if and only if agreed sets of trustees cooperate;

tracing from a payment to the payer by cooperation of a set of trustees;

tracing from a payment to the payer without revealing to trustees which payer is being traced or which payment;

identifying all payments by a payer provided appropriate trustees cooperate;

identifying all payments by a payer under investigation without trustees learning which payer and/or which payments;

limiting resolution to groups of payers in tracing for statistical purposes;

allowing limited different markings of payment instruments while preventing payers from learning which marking they receive;

providing for recovery of lost money without compromise of unrelated transactions;

allowing participants the ability to retain, not forward, and even destroy some tracing information without financial harm;

providing the option of artificial increase in the computational cost of at least some tracing;

providing the option of blurry linking of payments to payers; and allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

Figure 4A:
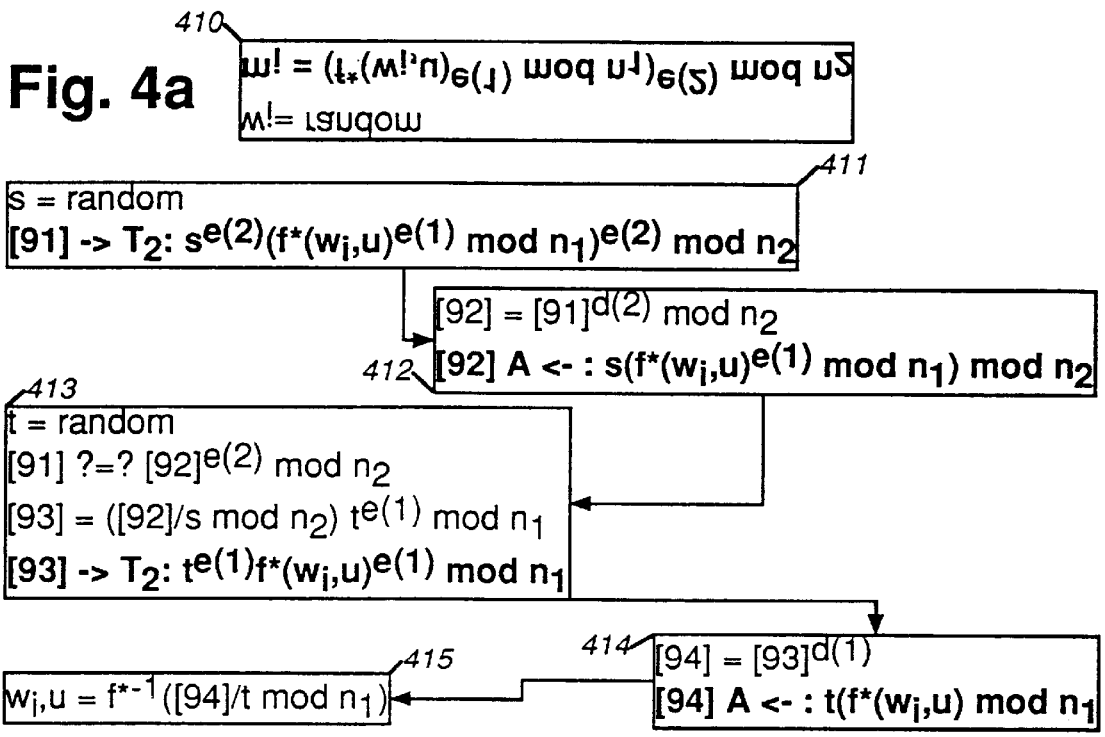
FIG. 4a shows a flowchart of a first preferred exemplary embodiment of both a form of money and a blinded, two-trustee protocol for tracing without the trustees learning either what was traced or who it was traced to, in accordance with the teachings of the present invention.
Figure 4B:
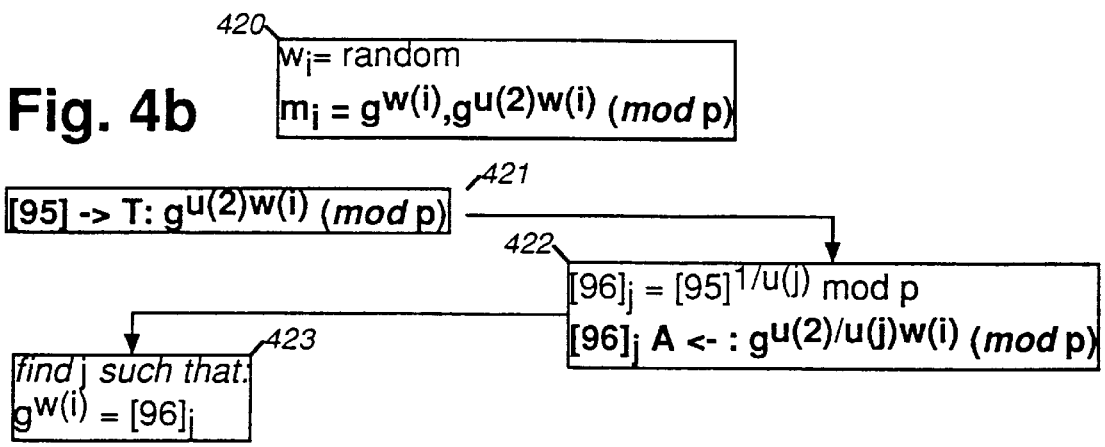
FIG. 4b shows a flowchart of a first preferred exemplary embodiment of an alternate form of money and a single trustee, as well as an unblinded form of a tracing protocol, all in accordance with the teachings of the present invention.
Figures 4C, 4D, 4E, 4F, 4G:
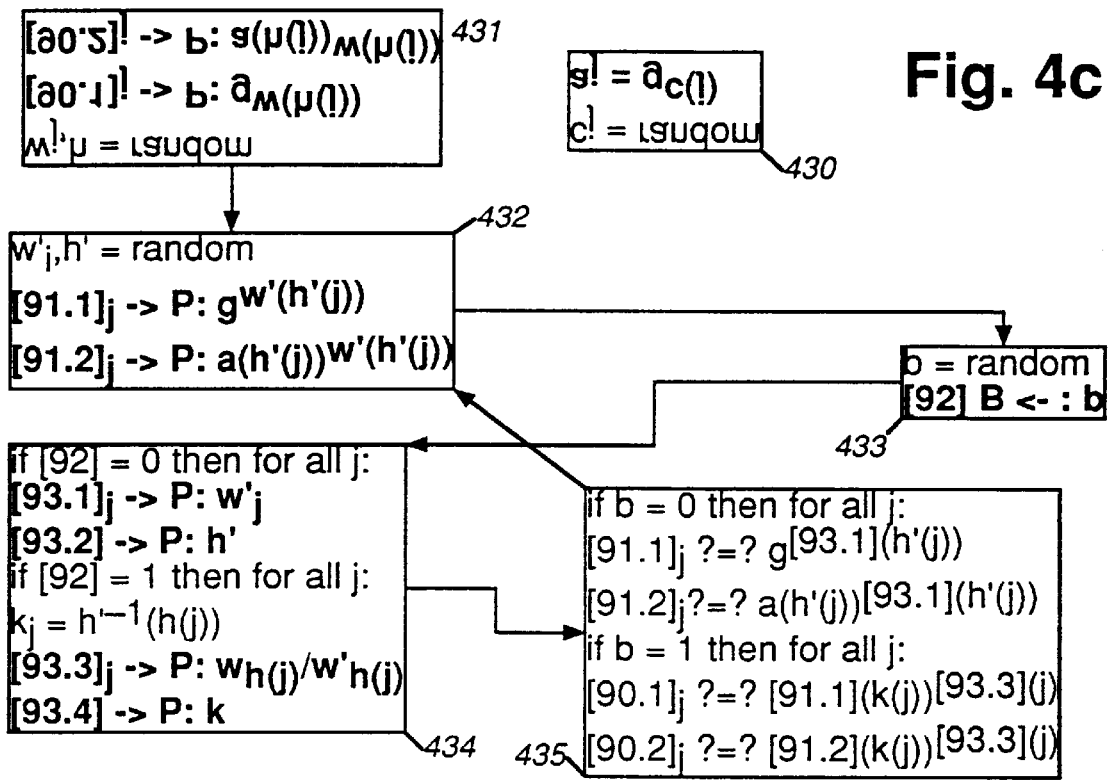

FIG. 4c shows a flowchart of a first preferred exemplary embodiment of a system for convincing a payer P that a particular set of linking information is merely a permuted copy of a list developed by the trustee(s), thereby allowing a payer substantial certainty that they are linkable to an entry on the list, but substantially inability to determine which entry on the original list they are linked to, all in accordance with the teachings of the present invention.

FIG. 4d shows a flowchart of a first preferred exemplary embodiment of a system for allowing blacklisting information to be developed with knowledge of the payer account, in accordance with the teachings of the present invention.

FIG. 4e shows a flowchart of a first preferred exemplary embodiment of a system for making the work required to trace substantially as high as desired, in accordance with the teachings of the present invention.

FIG. 4f shows a flowchart of a first preferred exemplary embodiment of a system for restricting the blinding factor and also another use of the truncation function just described, both in accordance with the teachings of the present invention.

FIG. 4g shows a flowchart of a first preferred exemplary embodiment of another example of the choice of a blinding factor from a limited range corresponding to certain limited values, in accordance with the teachings of the present invention.

BRIEF SUMMARY OF THE INVENTION

In accordance with the forgoing and other objects of the present invention, a brief summary of some exemplary embodiments will now be presented. Some simplifications and omissions may be made in this summary, which is intended to highlight and introduce some aspects of the present invention, but not to limit its scope in any way. Detailed descriptions of preferred exemplary embodiments adequate to allow those of ordinary skill in the art to make and use the inventive concepts are provided later.

The essential way of providing for limited tracing is to put tracing information into the money numbers that will be spent or to ensure that it is in the blinding parameters used in withdrawing them.

There are various ways of ensuring that the tracing information is in place. Examples include: the payer's tamper-resistant device can form it or certify that it is in place; a trustee can put it in place; the issuer can put it in place; a protocol between the issuer workstation and the payer can ensure the issuer that it is in place without revealing the tracing information to the issuer, or a protocol involving a tamper-resistant device communicating only with the workstation can convince the issuer that the information is in place.

There are various types of tracing information. Examples include: information that can be used to identify the payer if each trustee does some computation on it; information that allows an acceptor to do a computational test based on a cryptographic witness for a payment that is not to be honored or that is to cause an alarm if recognized; information that can be reconstructed by the trustees so that they can publish in effect a blacklist of all payments by a payer, information that lets the payments of a particular payer be recognized based on withdrawal and payment data; information that links a payer to a group of payers, without the payer needing to know which member of the group the linking is to; and seed information that the payer can recover in case other payment information is lost by the payer.

If payments are to be traced, then some trustees are preferably required, giving a separation between the role of allowing tracing on the one side and, on the other side, of issuing and guaranteeing the funds. There may be various sets of trustees corresponding to different kinds of tracing information and different payers. There may also be a variety of quorum conditions that are sufficient to allow tracing, such as two out of three or unanimity. Furthermore, the tracer party doing the tracing might not wish to reveal certain things to the trustees, such as which payment is being traced or which person is being investigated.

GENERAL DESCRIPTION

The drawing figures and the detailed descriptions provided later make a number of simplifying assumptions for concreteness and for clarity in exposition. It will be appreciated, however, that these should not be taken to limit the scope of the invention.

Lines and arrows in the drawing figures represent messages, which may be held initially or delayed on their way, passed through various parties, encoded and decoded cryptographically or otherwise to provide their authenticity and/or secrecy and/or error detection and/or error recovery. Thus the particular means or methods whereby messages are transferred are not essential to the present invention, and it is anticipated that any technique may be employed in this regard.

The term "party" is used herein to indicate an entity with control over at least the secrecy of some information, usually at least one key. It is anticipated that a plurality of people may each know all or in effect part of some key, and they might be thought of collectively as a party. In other cases, a key may be substantially unknown to people, and reside in some physical device, and then the device itself or those who control it from time to time may be regarded as parties.

Assigning a variable a "random" value performs the function of creating a value that should not be readily determined by at least some party. Many means and methods are known in the art for generating such unpredictable quantities, often called keys. Some are based on physical phenomena, such as noise in semiconductors, or patterns detected in humans pushing buttons, or possibly deterministic cryptographic techniques sometimes called pseudorandom generators. It is well known in the art that these various techniques can often be combined, and that post-processing can often improve the results. Thus the particular means or methods whereby random values are derived is not essential to the present invention, and it is anticipated that any technique may be employed in this regard.

To "convince" or "prove" something or to "transfer conviction" about something to a party are all interpreted to correspond to the notion, widely known and appreciated in the art, of a technical method or means that substantially removes doubt. Typically the removal of doubt relies on the assumption that certain computational problems are substantially intractable. It also typically accepts a probability, of a party being falsely convinced, that is preferably exponentially small in a security parameter. But these typical attributes are not necessary and can sometimes be avoided. If the party receiving conviction does not receive conviction about anything else of substantial utility, then the conviction will be said to be "separate."

The choice of party names, and the number of parties are examples of choices made for clarity and convenience. Naturally, the inventive concepts disclosed here should not be interpreted as limited to a particular type, grouping, or multiplicity of parties nor should there be any other implications of naming conventions or the like.

Figure 1:
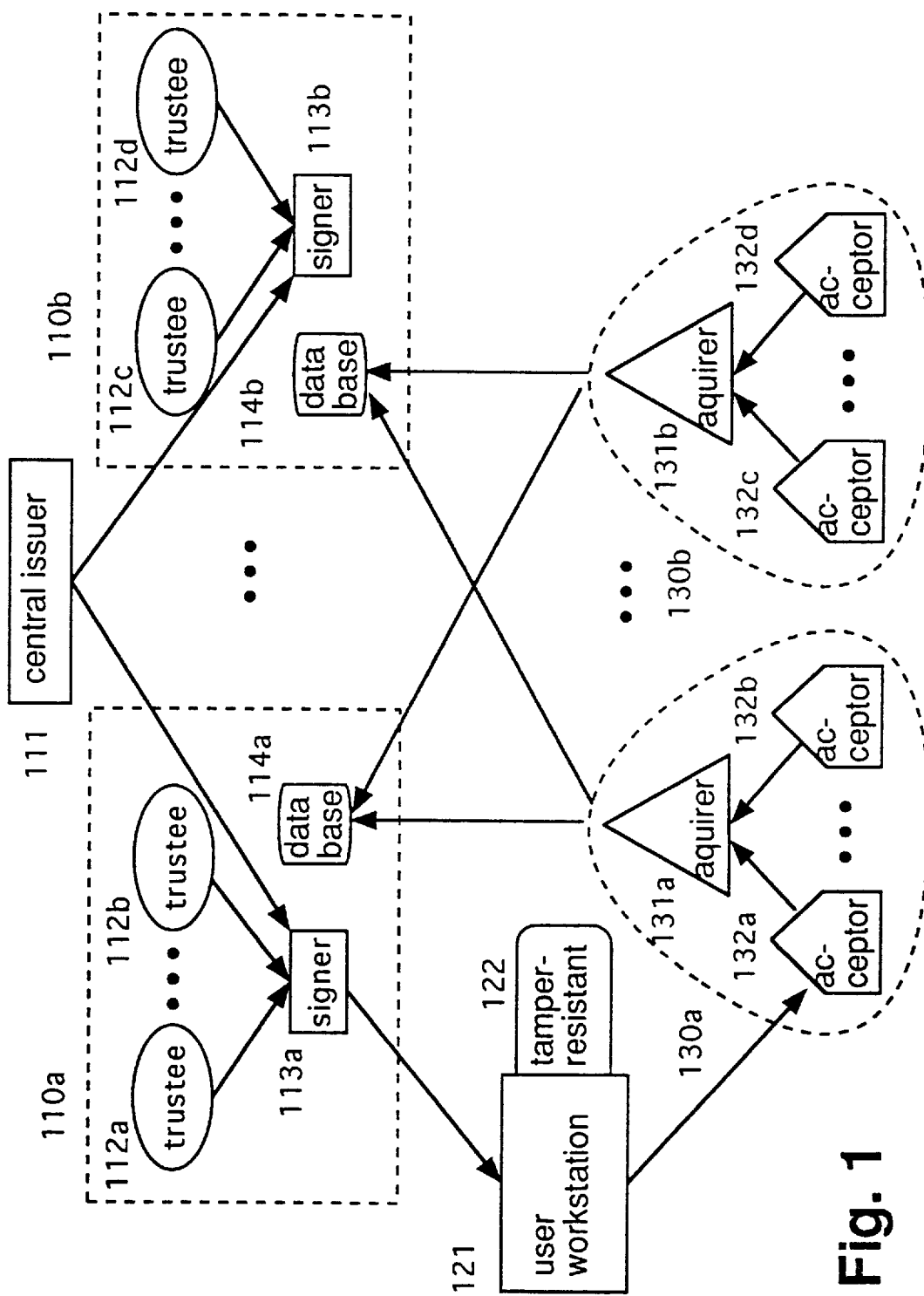
FIG. 1 shows a combination general block, functional and flow diagram of a preferred embodiment of overall structure means and working methods of a payment system in accordance with the teachings of the present invention.

Turning now to FIG. 1, a combination general block, functional and flow diagram for a preferred embodiment will now be described in detail. It shows the overall structure means and working methods of a payment system in accordance with the teachings of the present invention. The component parts will now be considered separately.

Trustees 112a through 112d are parties maintaining secret information that can be useful in tracing. For particular information, a collection of more than one trustee may cooperate. In which case a quorum of those trustees is a subset or the full set sufficient to use the particular information. Each payer may have a different set of trustees for each different kind of tracing information or, on another extreme, there may be a single set of trustees for a whole system. The figure shows sets grouped by issuers 110, to be described, for clarity only. Other parties, such as the signer or issuer may be all or part of a trustee set. It is, however, believed desirable where practical for the trustees to be distinct from the issuers of money, as the trust relationships and functions of the two groups differ and payers should be able to choose among them separately.

Signer 113a and signer 113b, collectively signers, are the parties who make the signatures on behalf of an issuer 110 that validate money. They might typically be embodied as tamper-resistant security modules and might be stored in secure locations. The signing process may involve verification that certain tracing information is properly encoded within the money numbers being signed. For this purpose, the signers may need data from trustees that allows them to determined this but which preferably is insufficient to allow them to trace without cooperation of the trustees. Ideally, such data supplied to issuers should be supplied only occasionally and be rather compact, thereby reducing the need to process large amounts of data and to rely on the availability of the trustees for issuing money. This data may even be supplied by the trustees directly to payers, who may only provide authenticated copies of it to signers. Nevertheless, the figure shows the information flowing directly from the trustees 112 to the signers 113.

Database 114a and 114b are devices or processes that store the received payment transaction data that is returned to the issuer. The purpose of such storage may be to detect improper multiple spending of the same number. Some payment transactions may be truncated by trusted parties before they reach the issuer from which they came.

Issuer 110a and 110b are parties, such as banks, who issue money and must ultimately be responsible for honoring it later. They include the singer 113 and database 114 functions already described. They may, as indicated and already mentioned, have also an associated set of trustees, or themselves be trustees. They may receive authorization, in the form of certificates, or contribution to individual signatures from a central issuer. For instance, the central issuer may be a national bank, or international payment system, and the issuers may be banks.

Acceptors 132a through 132d are parties that receive payments directly from payers. They may test the transactions, discard, store and forward all or parts of the data selectively depending on pre-arranged rules, outcomes of tests, and communication with other parties. Although shown only providing output to a single aquirer, they may give various different outputs to multiple aquirers and/or communicate directly with issuers. Not shown for clarity are the other communication paths to the acceptors, such as those that update their rules and values needed in testing.

Aquirers 131a and 131b are parties on the way from the acceptors 131 to the issuers 110. They may form part of a hierarchy as shown, or they may more generally be part of a network. They perform such functions as aggregation of data, hiding of detail, gateway to issuers, trust/contractual relations with issuers and acceptors. They may also, for instance, also be issuer themselves. Different acquirers may process different parts of a single transaction, such as, for example, because different pieces of tracing information in the money number are to be handled in different ways.

Acquisition networks 130a and 130b are collections of parties that ultimately do cooperate in returning some payment data to issuers. There may be multiple distinct such acquisition networks, each possibly an issuer itself, or these functions may overlap in a more general way.

Tamper-resistant device 122 is computation, control, storage, and communication means presumed at least substantially difficult for a user to modify or to obtain secrets from. For instance, this might be a smart card or so-called observer issued by or on behalf of an organization, such as the central or other issuers, to the individual payer. Although not shown for clarity, it could be used directly in cooperation with both issuers and acceptors. Preferably, however, as known from "Card computer moderated systems," and "Optionally moderated transaction systems" referenced above, it may communicate with other parties, at least at times, only through the user workstation 121.

User workstation 121 is a computing resource preferably largely under the control of the system user. Examples are personal computers, whether installed at fixed locations or portable. The issuers are not able to trust that such a device remains free from modification of its intended function or whether it can maintain secrets from users.

The workstation 121 may be used without a tamper-resistant device 122. In this case, the issuer can still obtain confidence in the proper form of the money numbers withdrawn, particularly with regard to the tracing information they are to contain, even if they are withdrawn in a blinded form. One way to achieve this is by protocols that convince about the structure but do not reveal tracing information. Examples of these are presented in detail later, for instance in FIG. 3.

Cooperation with tamper-resistant device 122 is believed to allow certain advantages described more fully in the last two references cited above. The tamper-resistant device may provide certification, based on its secret keys, that certain possibly blinded money numbers are properly formed. It may do this by virtue of having constructed the numbers itself, verified the construction by the workstation, or cooperatively constructed them together with the workstation. This certification may be relied on exclusively. Alternatively, the workstation only techniques described above may be combined with this technique to obtain the best of both, along the lines disclosed in the last two cited references.

DETAILED DESCRIPTION OF PREFERRED EMBODIMENTS

Turning now to FIG. 2, and referring specifically to FIG. 2a, a flowchart for part of a preferred embodiment will now be described in detail. It shows an overall process from tracing key creation to payment transaction iteration.

Box 211 first shows the creation and agreement on tracing keys by one or more trustees and the payer. Other parties, such as the issuer could also be involved, as will be described for instance with reference to FIG. 4c. Public tracing keys, such as in FIGS. 4a and 4b, could be created by the trustees. Certain padding values, as will be described in FIG. 4, may be created by the user. Trustees must be able to trace and payers must use the system, and therefore the two groups should agree on the tracing keys.

Box 212 indicates that the issuer should be aware of the tracing keys being used. If the issuer is not the trustee, then the issuer should, it is believed, be able to verify that the proper tracing information is present in payment signatures. This will be illustrated more fully later with reference to FIG. 4.

Box 213 is the issuing of signatures to the payer. It is believed that during this step the issuer should be able to ensure that the agreed tracing information is contained in the money withdrawn. The cut-and-choose protocol of FIG. 3, for instance, is believed to provide this function.

Box 214 portrays the spending of money with an aquirer. Some, if not all, of the tracing information is provided in the payment to the aquirer. Parts of it may be hidden or omitted as may become known to and/or accepted by the parties, as will be further described with reference to FIG. 2b. The arrow returning to box 213 is intended to indicate that during an ongoing series of payments, additional withdrawals may be required.

Box 215 stands for the transfer of payment information from the initial acceptor of payment through a network of operatives. Some paths through the operatives may lead back to the issuer, but not all payment data may be provided on each path, as will be described more fully with reference to FIG. 2b. The arrow returning to box 214 is meant to depict the possibility for multiple payments between withdrawal transactions.

Figure 2A:
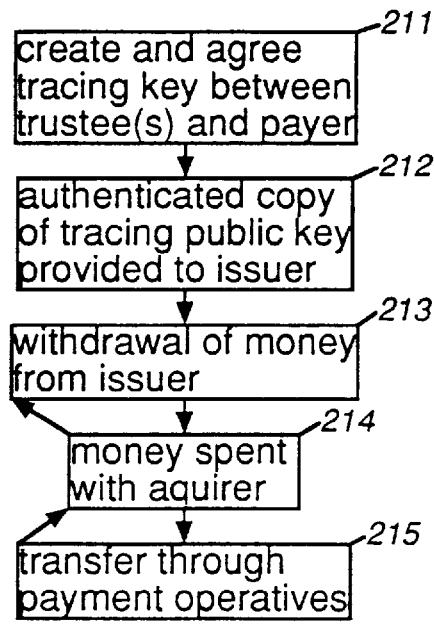
FIG. 2a shows a flowchart of a preferred embodiment of an overall process from tracing key creation to payment transaction in accordance with the teachings of the present invention.
Figure 2B:
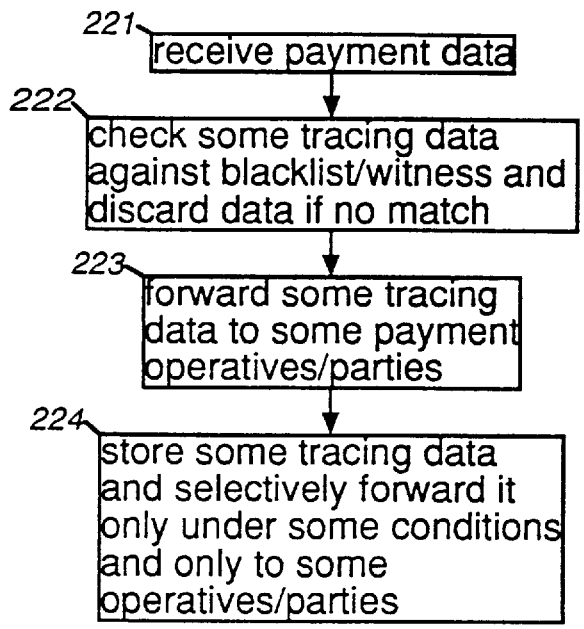
FIG. 2b shows a flowchart of a preferred embodiment of exemplary means and methods whereby payment data flows from the payer through a network of operatives and may ultimately reach the issuer, all in accordance with the teachings of the present invention.

Referring specifically now to FIG. 2b, a flowchart for part of a preferred embodiment will be described in detail. It shows exemplary means and methods whereby payment data flows from the payer through a network of operatives and may ultimately reach the issuer.

Box 221 is the receipt of payment data by an acceptor of payments. How much data the acceptor requires may vary, depending, for instance, on random chance, the nature of what is sold, various relationships with other payment operatives, and so on.

Box 222 depicts the testing of the received data by the acceptor. One type of testing that can be done locally by an acceptor is simply searching for a match between the payment data received and the entries on a blacklist, as will be described more fully later with reference to FIG. 4d. Another type of testing requires computation involving witness values, as will be described more fully later, for instance with reference to FIG. 4b.

Substantial protection against clandestine and/or other improper tracing can be provided by distributing the parties that would have to cooperate to trace. Thus, having blacklists searched by potentially many acceptors of payments is believed to mean that it would be difficult to hide the extent of blacklisting from such parties, and possibly consequently from the payer community as a whole. Furthermore, as indicated, the parties may destroy all or part of the tracing information after no match occurs. In this last case, clandestine, retroactive, or tracing further down the path of the transaction data is believed to become more difficult if not substantially impractical.

Box 223 indicates that some tracing data, which might be part of the tracing data contained in a payment, may be forwarded by the initial acceptor of the payment to other payment operatives. Some of these operatives may in turn test, destroy, forward, or retain such data. And the process may go on as the data makes its way, possibly through various concurrent paths of a network, and possibly ultimately to the original issuer.

Box 224 is the holding of data by a payment operative and the selective forwarding of all or part of such data. For instance, an operative may hold on to some data, with or without forwarding it, for some period or until some event transpires. During the period the data is kept, the operative may decide to forward all or part of it to other parties, depending on various factors, such as authorization/request and the type of tracing data. Of course once the data is destroyed, the operative can no longer forward it.

Figure 2C:
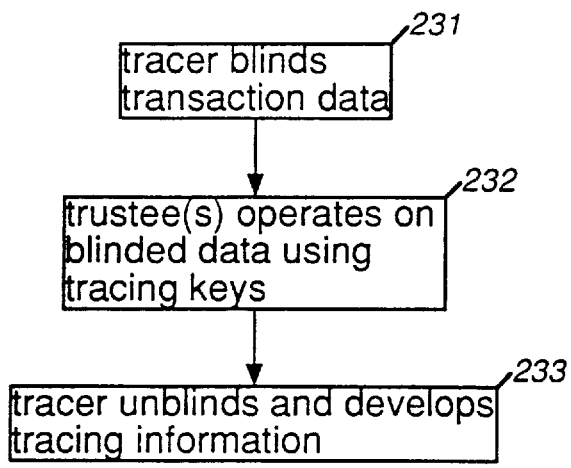
FIG. 2c shows a flowchart of a preferred exemplary means and methods whereby tracing is conducted and optionally trustees are kept from knowing from where and/or to where they are tracing, in accordance with the teachings of the present invention.

Referring specifically now to FIG. 2c, a flowchart for part of a preferred embodiment will be described in detail. It shows exemplary means and methods whereby tracing is conducted and optionally trustees are kept from knowing from where and/or to where they are tracing.

Box 231 shows that a tracer party, possibly distinct from an issuer or trustee, can optionally blind the transaction or other data which is to be traced. Examples of this will be presented later in FIG. 4a.

Box 232 depicts the application of tracing keys by one or more trustees in the process of developing tracing information from transaction information. Thus, without the tracing keys, the transaction data is believed substantially impractical to develop into tracing information. Further examples of this are shown, for instance, in FIGS. 4a and 4b.

Box 233 is the optional unblinding of the tracing data and the development of the tracing information. Examples, of this process are, for instance, provided in FIG. 4a.

Figure 2D:
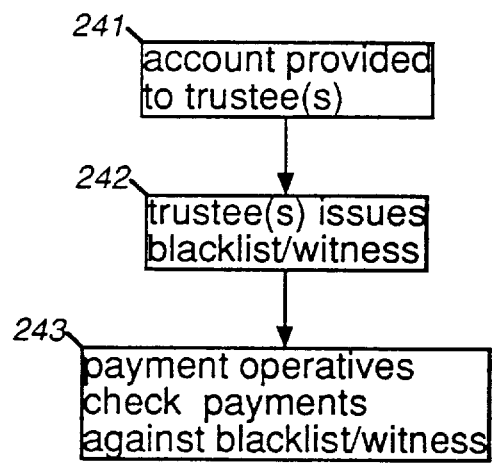
FIG. 2d shows a flowchart of a preferred exemplary means and methods whereby trustees allow tracing from an account identifier to actual payment transactions, in accordance with the teachings of the present invention.

Referring specifically now to FIG. 2d, a flowchart for part of a preferred embodiment will be described in detail. It shows exemplary means and methods whereby trustees allow tracing from an account identifier to actual payment transactions.

Box 241 provides the account identifier to the trustees.

Box 242 indicates that the trustees develop a blacklist or witnesses. A blacklist is just searched for a match. A witness allows the acceptor of payments, not being a trustee, to perform a computational test other than simple matching, to determine if the payment is traced.

Box 243 is the checking of payment transactions by payment operatives, such as acceptors, using the blacklist or the witnesses just described. Further examples are provided in FIG. 4a and 4b.

Figure 2E:
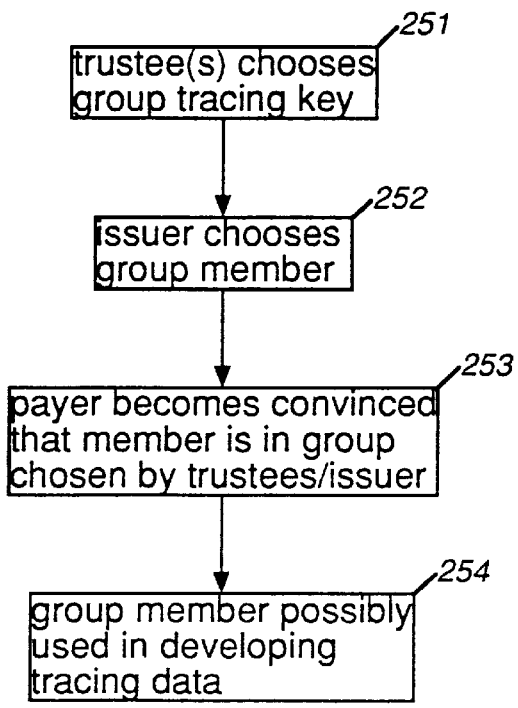
FIG. 2e shows a flowchart of a preferred exemplary means and methods whereby a payer can obtain an identity from a group of identities that can be traced by a trustee, in accordance with the teachings of the present invention.

Referring specifically now to FIG. 2e, a flowchart for part of a preferred embodiment will be described in detail. It shows exemplary means and methods whereby a payer can obtain an identity from a group of identities that can be traced by a trustee.

Box 251 is the developing of a group of identities by one or more trustees. This is done preferably keeping secrets, on which the group is based, that will allow tracing a transaction or member of a derived group to a particular group member only by trustees.

Box 252 is the selection by the issuer of an identity within the group for use by the payer.

Box 253 is where the payer becomes convinced that the identity is among the members of the group chosen by the trustees and or the issuer.

Box 254 is the eventual possibility of development of tracing information, and eventual tracing, requiring cooperation of a quorum of relevant trustees.

Figure 2F:
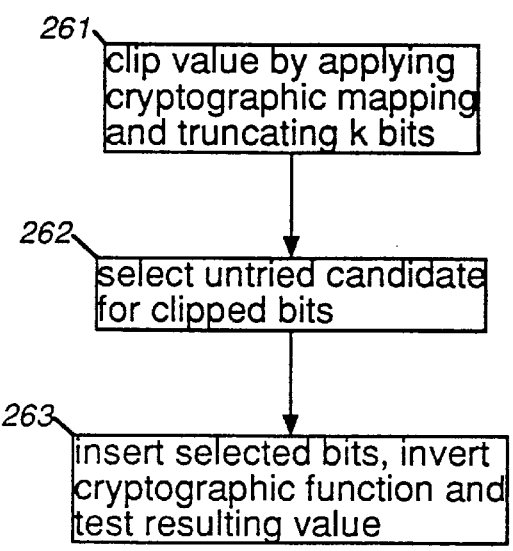
FIG. 2f shows a flowchart of a preferred exemplary means and methods whereby computational difficulty of tracing can be increased and tracing can be conducted accordingly, in accordance with the teachings of the present invention.

Referring specifically now to FIG. 2f, a flowchart for part of a preferred embodiment will be described in detail. It shows exemplary means and methods whereby computational difficulty of tracing can be increased and tracing can be conducted accordingly.

Box 261 is the clipping, deletion, or other restriction of information from the encrypted form of tracing information before it is used in transactions.

Box 262 presents how a tracing party is believed to need to develop possible values for the clipped values.

Box 263 is the testing of a possible clipped value by substituting such a possible value for the clipped values and then inverting the cryptographic operations in search of redundancy adequate to confirm the correctness of the possible value being tested.

Figure 2G:
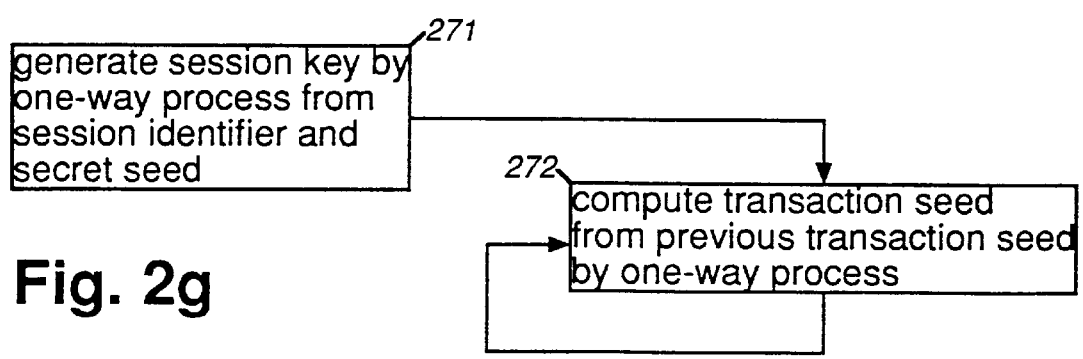
FIG. 2g shows a flowchart of a preferred exemplary means and methods whereby a secret seed is used to develop the parameters needed to protect unlinkability and can later be used to allow tracing of those values, in accordance with the teachings of the present invention.

Referring specifically now to FIG. 2g, a flowchart for part of a preferred embodiment will be described in detail. It shows exemplary means and methods whereby a secret seed is used to develop the parameters needed to protect unlinkability and can later be used to allow tracing of those values.

Box 271 describes generation of a session key by a one-way process from session identifiers and a secret seed. For instance, the secret seed could be a value that the payer holds in reserve, such as by keeping it in a safe place and/or dividing it by known secret sharing techniques among a set of parties. The session parameters could be the serial number or date of the last withdrawal transaction.

Box 272 indicates an iterative process, depicted by the feedback arrow, by which a transaction seed is generated. If the value of a transaction seed were to be divulged by the payer, then all subsequent payments until the next withdrawal session could be traced. Thus, if payment information is lost by the payer, the session seed and the identifier of the last withdrawal session, and the serial number of the last known payment, can be used to reconstruct the transaction seed for the next transaction. This transaction seed could then be provided, or otherwise used, to allow tracing of any subsequent payments. Thus, after a key change, for instance, the issuer could be sure that no subsequent payments occurred and could refund the unspent lost payment amounts.

Figure 3:
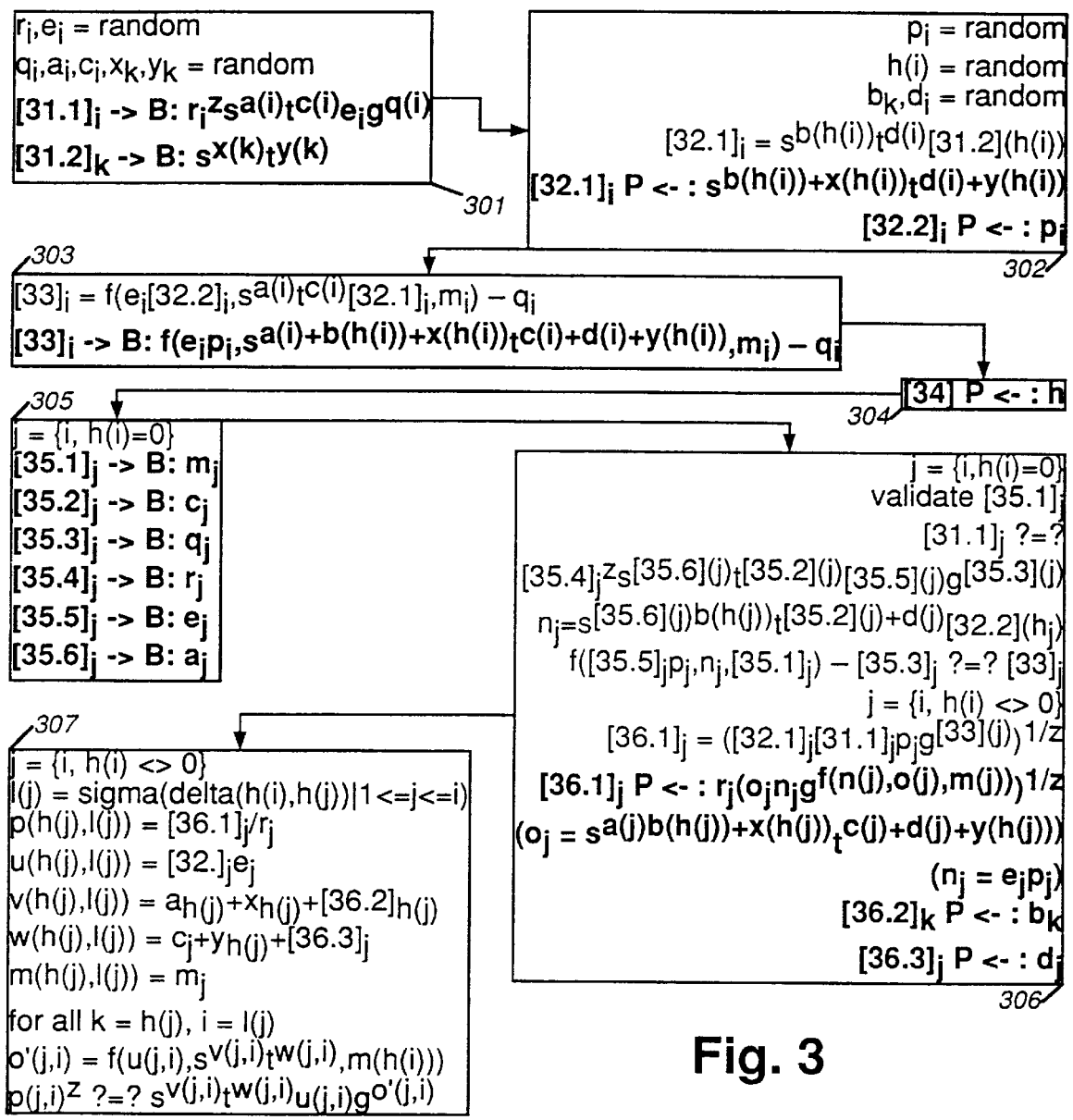
FIG. 3 shows a flowchart of a preferred embodiment of a cut-and-choose protocol performed between parties denoted bank B and payer P in accordance with the teachings of the present invention.

While it is believed that the notation of FIGS. 3 and 4 would be clear to those of ordinary skill in the art, it is first reviewed here for definiteness.

The operations performed are grouped together into flowchart boxes. One kind of operation is an equality test. The "?=?" symbol is used to indicate such a test, and the party conducting the test terminates the protocol if the equality does not hold. (If the test is the last operation to be performed by a party during a protocol, then the success or failure of the test determines the party's success or failure with the protocol.)

Another kind of operation is that of sending a message. This is shown by a message number on the left; followed by a recipient name and an arrow (these appear for readability as either a recipient name then left pointing arrow, when the recipient is on the left; or right pointing arrow then recipient name, when the recipient is on the right); followed by a colon; finally followed by an expression denoting the actual value of the message that should be sent. (These operations are depicted in a "bold" typeface for clarity.) Square brackets are used to delimit message numbers and such an expression stands for the value of the corresponding message.

The further operation of saving a value under a symbolic name is denoted by the symbolic name on the left hand side of an equal sign and an expression on the right hand side.

Several kinds of expressions are used. One is just the word "random." This indicates that a value is preferably chosen uniformly from an appropriate set of values (defined in the text where not obvious to those of skill in the art) and that is chosen independently of everything else in the protocol. Creation of random values has already been mentioned.

A further kind of expression involves exponentiation. All such exponentiation (unless noted otherwise) is in a finite group. When no operation is shown explicitly, multiplication in such a group is assumed. When "/" is applied between elements of such a group, the result can be calculated by first computing the multiplicative inverse of the expression on the right and then multiplying it by the expression on the left—but this operation may also be described simply as division. When the "/" is used between exponents, and if the result is a proper fraction, it indicates a corresponding root, as is well known in the art.

Turning now to FIG. 3, a flowchart for part of a preferred embodiment will now be described in detail. It shows a cut-and-choose protocol performed between parties denoted bank B and payer P. It will be appreciated that a general cut-and-choose protocol is disclosed here, and that it is believed to offer certain advantages; however, other known cut-and-choose protocols, such as those disclosed in the above referenced patent entitled "One show blind signature systems" could of course be applied as well. Other more specific protocols are also anticipated.

Box 301 first shows P choosing $r_i$ and $e_i$ at random. Both are base numbers in the modular arithmetic system used throughout FIG. 3. The modulus for this system has been created by B from preferably two random primes of sufficient size, as is well known in the art. A plurality of other random values are chosen modulo z, which is the preferably prime public exponent of sufficient size also chosen by B. These values are $q_j$, $q_i$, $c_i$, $x_k$, and $y_k$. The index j runs over the number of results that are to be obtained, which may be though of as the number of payments that will later be possible. The index i runs over the total number of initial candidates, which is believed to need to be significantly larger than j in order to obtain the desired level of security as is well known in the art and has been investigated in detail elsewhere. (The form of h is also believed relevant in this connection and example values will be provided when h is introduced later). Now P is shown forming a first message $[32.1]_i$ and sending it to B. The message is just the product of the values $r_i$ raised to the z, s raised to the $a_i$, t raised to the $c_i$, $e_i$, and g raised to the $q_i$. The values s, t, and g are simply public generators. It is believed desirable that B has chosen these and provides a proof that any one can be expressed as a power of any other one of the three. This could easily be accomplished using well known protocols, such as Chaum, Evertse, v.d. Graaf, and Perlata "Demonstrating possession of a discrete log without revealing it" CRYPTO ''86, Springer-Verlag, 1987, pp. 200–212. The other message shown sent by P to B in this box is simply s to the $x_k$ power times t to the $y_k$ power.

Box 302 defines the actions of B after the above mentioned two messages are received from P. First a random base number $p_i$ is chosen. It will be appreciated that the index values i and j are used similarly by both parties.

Then the random map h is selected. This domain is the candidate indexes, being integers from 1 to the number of candidates. The range includes 0 as a distinguished entry and the integers from 1 to the number of payments that will result, as already mentioned for k. When a candidate index maps to 0, it will be "opened" later. All the candidates that map to a particular nonzero value will make up the check with that number. Every check is assumed for simplicity to have the same number of candidates. Example values, that are believed adequate for a substantial level of security, might be 1000 candidates, 10 per check, with a total of 80 check and 200 opened candidates. Extensive analysis of such parameters have been made and are known in the art.

Also chosen at random are $b_k$ and $d_i$, all residues modulo z. The first message $[32.1]_i$ to be sent by B to P is formed as a product of three terms: the already mentioned generator s, raised to the $b_{h(i)}$ power; t raised to the $d_i$ power; and received message $[31.2]$ indexed by $h_i$. This message has the form shown corresponding to how it was formed with the included message multiplicatively contributing a power of s and of t. Also shown being sent are the pi as message $[32.2]_i$.

Box 303 describes how P forms the exponent request message $[33]_i$ that is sent to B. The value is formed, per candidate, modulo z as is well known, as the output of the one-way function f, having three inputs, minus the value $q_i$ already mentioned. The first argument of f is the base value of the ultimate signature, $e_i$ times pi received in message $[32.2]_i$ already mentioned. The second argument is the powers of s and t; s appears to the $a_i$ and t to the $c_i$, with the additional s and t powers provided by B from received message $[32.1]$. The third argument is the money number $m_i$. Thus, the actual form sent reveals the content of $[32.1]_i$, which was already described with reference to box 302.

Box 304 is just the sending of the entire map h from B to P. For clarity as will be appreciated, h is shown in the boxes of P, not as a message number, but in symbolic form.

Box 305 sends the opening of candidates that have an index that h maps to 0. Six values are sent per opened candidate: m, c, q, r, e, and a, in messages $[35.1]$ through $[35.6]$, respectively.

Box 306 indicates first a checking of the opened candidates and then the supply of the actual roots and powers needed to obtain showable signatures.

First the value of m is "validated," which is intended to denote any sort of testing that may be appropriate, such as testing that the form has the proper linking structure, as will be described more fully later. For each j that is mapped to 0 by h, two equalities are tested. In the first, message $[31.1]$ should equal received message $[35.4]$ raised to the z, times s raised to the received message $[35.6]$ times t raised to the received message $[35.2]$ times received message $[35.5]$ times g raised to the received message $[35.3]$. For the second equality, n is formed for convenience formed to collect the powers of s and t. The powers of s shown are received message $[35.6]$ plus b. The powers of t shown are received message $[35.2]$ plus d. Also are the contributions from message $[32.1]$ already sent by B. Now all the messages $[33]$ received are reconstructed as an image under f minus the corresponding message $[35.3]$ received. The first argument for f is received message $[35.5]$ times p. The second is n. The third is message $[35.1]$ received.

Three values are provided to P, two for each unopened candidate and one for each check. The first, per candidate, is message $[36.1]$, the z'th root on the product of four terms: $[32.1]$, $[31.1]$, p, and g raised to the requested power $[33]$. A different use of temporary value n, and one of temporary value o are used for clarity in denoting the form of this first message sent. The second message, which is per check, is b and is sent as $[36.2]$ (with subscript k). The third and final message, which is per candidate, is d.

Box 307 represents the putting in convenient order for storing and then the final testing of the signature by P. Each value is re-indexed to have two indices, the first for the check number and a second for the serial number of the candidate within that check. The ordering is chosen arbitrarily as preserving the check numbers and with serial numbers in the same order as the corresponding original candidate. Thus, the first value is p, which is the signature $[36.1]$ with the blinding factor r divided out of it. The second is u, which is the base value e times p from message $[32.2]$. The third is the power of s, being the sum of x and b from message $[36.2]$. The fourth and final is the power of t, which is the sum of the corresponding c, of the y, and d from message $[36.3]$.

For completeness, the testing of the signature, which could be performed also when the signature is received by another party, is shown. The z'th power of the signature p itself is compared for equality with its reconstruction as a product of four terms. The first is s raised to the v; second is t raised to the w. The third is the base u. and the fourth is g raised to the image under f, which for convenience is denoted o'. To compute o', f has been shown as applied to three arguments: u, s to the v the quantity times t to the w, and m.

Turning now to FIG. 4, and referring specifically to FIG. 4a, a flowchart for part of a preferred embodiment will now be described in detail. It shows both a form of money and a blinded, two-trustee protocol for tracing without the trustees learning either what was traced or who it was traced to.

Box 410 first shows that the value $w_i$ is chosen at random as an unknown padding to allow the concealment of the value u within the money number. Then the form of the money number is shown explicitly for clarity in a two trustee setting, where each trustee uses RSA as the trapdoor public mapping. Any other number of trustees or trap door public function(s) could, as would be obvious, be used. This form of the money number could, for instance, be entered as the value $m_i$, or as one of multiple components of that value, in a cut-and-choose, such as that of FIG. 3. Specifically, the money number is the composition of two mappings, the inner most is RSA encryption with the public key of $T_1$ and the outer layer composes encryption with the public key of $T_2$, such basic operations themselves being well known in the art.

Box 411 illustrates how a first blinding of the money number is performed by tracer A using s, a random residue modulo $n_1$. The message sent to trustee $T_1$ is just the money number already described times the blinding factor s raised to the public exponent $e_2$.

Box 412 has $T_1$ decrypt the message $[91]$ received and return this result to tracer A as message $[92]$.

Box 413 begins by forming a second blinding factor t, this one for use under the modulus of $T_2$. Then the result form $T_1$ may be tested simply by raising it to $e_1$, the pubic power of $T_1$, and checking that this results in message $[91]$. In forming message $[93]$ to send to trustee $T_2$, the blinding by s is divided out of message $[92]$ and the result is re-blinded with t using $n_j$, the modulus of $T_1$.

Box 414 again simply has a trustee, $T_1$ this time, decrypt using the corresponding secret key $d_1$. The input is message $[93]$, and the output is $[94]$.

Box 415 shows how received message $[94]$ is first unblinded by dividing out t modulo $n_1$. Then the inverse of f* is applied, to yield the original pair, already described, containing padding $w_i$ and revealing the identity of the payer u. As will be appreciated, f* is an optional and substantially invertable yet preferably cryptographic mapping that allows recovery of its arguments but is believed to distort structure, such a multiplicative structure, that might allow undesired interaction between the arguments and the signature scheme. Other uses for such a function in this position, such as for clipping, will be described later.

Referring specifically now to FIG. 4b, a flowchart for part of a preferred embodiment will now be described in detail. It shows an alternate form of money and a single trustee, as well as an unblinded form of a tracing protocol.

Box 420 displays an exemplary form of a money number represented as two residues modulo a common fixed public prime p (although any group could be used). The disguising, as in box 410, is shown by denoting the random formation of $w_i$. This value is applied as an exponent to each member of the pair of fixed values associated with the particular account. One such fixed value is simply a common public generator g. (It is anticipated, however, that specific powers could also be used here to advantage in some cases.) The other such value is that same generator raised to a value only known to the trustees. For clarity, a single value $u_2$ is shown, which could for instance be applied to all money numbers from this account. With multiple trustees, as would be appreciated, the value $u_2$ could be composed of the sum or product of contributions from multiple trustees.

Box 421 is the transmission of the second component of the money number by tracer A to trustee T.

Box 422 then has T remove each of a set of possible exponents from copies of message [95] received. One exponent could, for instance, correspond to one payer account and the whole set might cover all payer accounts. To remove an exponent, the value is raised to the multiplicative inverse, modulo the order to the group, of that exponent. Thus, it is believed for all but one of the $[96]_i$ returned by T to A, the exponent will not be canceled, because it was not there originally. But for the one of the values, the exponent was there and it is canceled.

Box 423 tests all the returned values, until one is found that is equal to the first component of the money number $g^w$. In this way the money number is traced to the account corresponding to the index i of the matching message [96].

As will be appreciated, elaboration is readily achieved. For instance, the multiple trustees as already mentioned could each remove their exponents one after the other. No fixed order, as in FIG. 4a, would be required. Blinding could be achieved, for instance, by using exponential blinding: [95] would be raised to a random power by A and the result returned by T would be raised to the inverse power. The message could still travel around through multiple trustees in any order and without, as in FIG. 4 a, coming back to A between each trustee. Furthermore, each trustee could first remove the account specific exponent and put in place the same exponent. This would then allow, for instance, permuting of various such values so that they can be operated on in the same way.

Referring specifically now to FIG. 4c, a flowchart for part of a preferred embodiment will now be described in detail. It shows a system for convincing a payer P that a particular set of linking information is merely a permuted copy of a list developed by the trustee(s), thereby allowing a payer substantial certainty that they are linkable to an entry on the list, but substantially inability to determine which entry on the original list they are linked to. An example application is marking of bank notes in a limited number of categories hidden from those withdrawing the notes.

Box 430 first indicates the formation of a public list of meta-identifiers by the trustee(s). The value $c_j$ is chosen at random and preferably remains confidential to the trustee(s); what can be provided to payers or even made public is $a_j$, which is set equal to a generator g in the group of public order used throughout this protocol. Thus there are n meta-identities, and j may be thought of as ranging from 1 to n. More than one trustee can supply a contribution to $a_j$, such that, for instance, the product of the contributions is taken as $a_j$; or, for example, each trustee could place a power on the accumulated value as it travels around among them.

Box 431 shows the formation of a set of identities by B. This is an optional feature that allows a non-trustee party, possibly such as the issuer, to create a permuted instance of a list of identities from the meta-list. First $w_j$ is chosen as a suitable exponent. The function h maps the indices of the meta-identity list into those of the identity list; that is, it is the permutation between the meta-identities and the particular set of identities created by B. Message $[90.1]_j$ is formed as g raised to the w selected by h applied to j. Also sent with and corresponding to each of these there is a $[90.2]_j$ formed as the meta-identifier list permuted by h, each raised to the w selected by h applied to j. Thus, each identifier is a pair g and a meta-identifier, both members of the pair being hidden by being raised to the same power of w.

Box 432 begins the loop part of the convincing, that can be repeated any number of times, as indicated by the arrows. It is believed that uncertainty is halved by each iteration, and for clarity the number of iterations is not shown explicitly. In order to create a list of temporary pairs, random exponents $w'_j$ and permutation h' are created at ransom, each essentially like its unprimed namesake. The message $[91.1]_j$ is formed as g raised to the particular w' selected by h' applied to j; similarly, $[91.2]_j$ is formed as a selected by h' of j, the quantity raised to the w' selected by h' of j.

Box 433 receives these above described commitment messages and then issues a random challenge bit b as message [92] provided to B.

Box 434 handles one of two cases: either b is 0 or it is 1. In the first case, $w'_j$ and h' are sent to P as messages [93.1]j and [93.2], respectively. In the second case, a permutation $k_j$ is formed as h' inverse composed with h. Message [93.3]j is formed as $W_{h(j)}$ times the multiplicative inverse of $w'_{h(j)}$. And message [93.4] is simply the mapping k.

Box 435 checks the response from B by evaluating a different pair of equalities depending on the value of b. If b is 0, then message $[91.1]_j$ received is compared for equality with g raised to the [93.1] selected by h' of j; $[91.2]_j$ is compared with α selected by h' applied to j, the quantity raised to the [93.1] selected by h' applied to j. In case b is 1, $[90.1]_j$ is compared for equality with [91.1] selected by $k_j$ the quantity raised to the power [93.3] selected by j; $[90.2]_j$ is compared to [91.2] selected by kj the quantity to the power [93.3] selected by j. (The values k and h' are shown for clarity with its alphabetic as opposed to its message number notation here.)

Referring specifically now to FIG. 4d, a flowchart for part of a preferred embodiment will be described in detail. It shows a system for allowing blacklisting information to be developed with knowledge of the payer account.

Box 440 shows the form of the money number $m_i$. It is shown as a modular sum, but other techniques as would be appreciated could be used, such as exclusive-or. The number of terms that must be combined is equal to the number of trustees, and they need not each work in the same way. The combination technique preferably allows any one contribution to block out and otherwise hide any other contributions, although its is anticipated that this property may be violated to some advantage in some circumstances.

One term shown is f applied to the $p_i$'th root of the universal identifier u, within the residue classes induced by the RSA composite $n_i$. The other term uses the same prime but a different modulus. The idea is that the trustee owning the modulus is able to construct all the roots on u and provide them to the payer; the bank, however, is unable to determine the roots, even though given any root opened during the cut-and-choose, the bank can verify that it is uniquely determined by its index and the payer identity u. Thus the index of the primes may preferably be taken as the candidate number. Also note that the method of combining terms allows a quorum of trustees to be required for tracing.

Referring specifically now to FIG. 4e, a flowchart for part of a preferred embodiment will now be described in detail. It shows a system for making the work required to trace substantially as high as desired.

Box 450 shows first how the payer forms a value $w_i$ at random. The value $m_y$, a money number, is formed as the truncation of a quantity. This is intended to indicate that some of the information in the quantity is left out. For instance, but without limitation, a simple example would be to perform the truncation operation as the leaving out of a predetermined number of bits of the representation of its argument. Thus, in this example, for each bit left out, the amount of computation that the tracer would have to do is believed to double.

The form of the money number that is the argument of the truncation function could be anything described elsewhere here. But, for definiteness, a specific form is shown, and it is the encryption using two public keys $e_1$ and $e_2$, as indicated by their position in the exponent. The value they encrypt is shown as an image under f* of the pair $w_i$ and u, the former having been chosen as random padding as already mentioned, and the latter being an identifier. The entire encryption is the argument for an outer application of f*.

If this money number is to be traced, it is believed that, provided f* is adequately strong, the most effective way to discover u should be to guess at the values of the omitted information, such as the deleted bits already mentioned. For each guess, the inverse of f* should be applied. Some redundancy could be included that would be recognizable at this point, so that the proper guess could be detected after the inversion. Alternatively, redundancy might only be recognizable only once the two encryptions are inverted, such as by the respective trustees, and the inner f* is inverted. In any case, u can be recovered by inverting the outer and then the inner f*.

Referring specifically now to FIG. 4f, a flowchart for part of a preferred embodiment will be described in detail. It shows both a system for restricting the blinding factor and also another use of the truncation function just described.

Box 460 forms a blinding factor $r_i$ as an (optional) truncation of the invertable cryptographic function f* applied to an account identifier as well as a random padding value $b_i$, all as more fully already described. Thus the blinding, as denoted also by $r_i$ in FIG. 3, does not have the full range of possible values. The value of the blinding factor is determined by forming the quotient of the guessed corresponding withdrawal and deposit, as is well known. Once the guessed blinding value is determined, and the truncated bits removed, then f* can be inverted and the redundancy in, for instance, the identifier u can be used to recognize the fact that a proper guess has been made.

Referring specifically now to FIG. 4g, a flowchart for part of a preferred embodiment will be described here in detail. It shows another example of the choice of a blinding factor from a limited range corresponding to certain limited values.

Box 470 depicts a second example of a restriction on the blinding factor $r_i$ from FIG. 3. It will readily be appreciated that the restriction on the blinding factor is verified as part of the cut-and-choose protocol. The particular example shown uses the form of money number already described in detail for FIG. 4a. The difference being only the outer application of the f*, which is intended, as already mentioned, to inhibit any undesired interaction between the values it encompasses and those that contain it.

As would be obvious to those of ordinary skill in the art, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition and are sometimes arbitrary. Also the order in which messages are generated within a box and sent may be of little or no significance.

It will also be obvious to those of ordinary skill in the art how parts of the inventive concepts and protocols herein disclosed can be used to advantage without necessitating the complete preferred embodiment. This may be more fully appreciated in light of some examples: Of course each different type of tracing can be used separately, as can each way of ensuring the tracing information is in place. Tracing by the payer, as disclosed here, could simply be used for backup purposes. Also, the protocol of FIG. 3 is a very general cut-and-choose, and could be used for credential or any other application of such protocols. Similarly, the protocol of FIG. 3c is of general utility.

Certain variations and substitutions may be apparent to those of ordinary skill in the art. For example, while the present specification and claims are cast in the language of payments for clarity in exposition, many other transaction systems can employ the basic techniques of limited traceability.

While these descriptions of the present invention have been given as examples, it will be appreciated by those of ordinary skill in the art that various modifications, alternate configurations and equivalents may be employed without departing from the spirit and scope of the present invention.

What is claimed is:

1. In a payment system apparatus, the improvement comprising:

means for providing a blind signature signal associated with electronic payment data;

means for forming at least part of one blinding signature signal, instead of at random from a substantially uniform distribution, from a distribution that is subject to a predetermined restriction; and means for convincing at least one party that at least the restriction substantially applies without revealing the at least part of the one blinding signal to the at least one party.

2. In a payment system apparatus, the improvement comprising:

means for providing a blind signature signal associated with electronic payment data; and means for developing a blinding value in a reproducible computation using a seed key substantially known only to an account holder party.

3. In the apparatus of claim 2, means for imparting a one-way property so that particular signal values are given that allow computing further blinding factors, the signal values given being such that it is substantially infeasible to use them to compute earlier-used blinding factors.

4. In a payment system method, the improvement comprising:

providing a blind signature signal associated with electronic payment data;

forming at least part of one blinding signature signal, instead of at random from a substantially uniform distribution, from a distribution that is subject to a predetermined restriction; and convincing at least one party that at least the restriction substantially applies without revealing the at least part of the one blinding signal to the at least one party.

5. In a payment system method, the improvement comprising:

providing a blind signature signal associated with electronic payment data; and developing a blinding value in a reproducible computation using a seed key substantially known only to an account holder party.

6. In the method of claim 5, imparting a one-way property so that particular signal values are given that allow computing further blinding factors, the signal values given being such that it is substantially infeasible to use them to compute earlier-used blinding factors.

7. In a payment system method providing a blind signature type of signal associated with electronic payment data; the improvement comprising:

forming at least part of one blinding signature signal, instead of at random from a substantially uniform distribution, from a distribution that is subject to predetermined restriction; and a payer convincing at least one party that at least the restriction substantially applies without revealing the at least part of the blinding signal to the at least one party.

8. In a payment system method providing a blind signature type of signal associated with electronic payment data and developing a blinding value in a reproducible computation using a seed key substantially known only to an account holder party, the improvement comprising:

imparting a one-way property so that particular signal values are given that allow computing in a forward direction blinding factors and the signal values given being such that it is substantially infeasible to use them to compute back to earlier-used blinding factors.

9. In a payment system apparatus having means for providing a blind signature type of signal associated with electronic payment data, the improvement comprising:

means for forming at least part of one blinding signature, instead of at random from a substantially uniform distribution, from a distribution that is subject to a predetermined restriction; and means for use by a payer to convince at least one party that at least the restriction substantially applies without revealing the at least part of the blinding signal to the at least one party.

10. In a payment system apparatus having means for providing a blind signature type of signal associated with electronic payment data and means for developing a blinding value in a reproducible computation using a seed key substantially known only to an account holder party, the improvement comprising:

means for imparting a one-way property so that particular signal values arc given that allow computing in a forward direction blinding factors and the signal values given being such that it is substantially infeasible to use them to compute back to earlier-used blinding factors.

\* \* \* \* \*